No. 640,763. Patented Jan. 9, 1900.
P. G. HALE.
MATCH SAFE.
(Application filed Sept. 28, 1898.)
(No Model.)
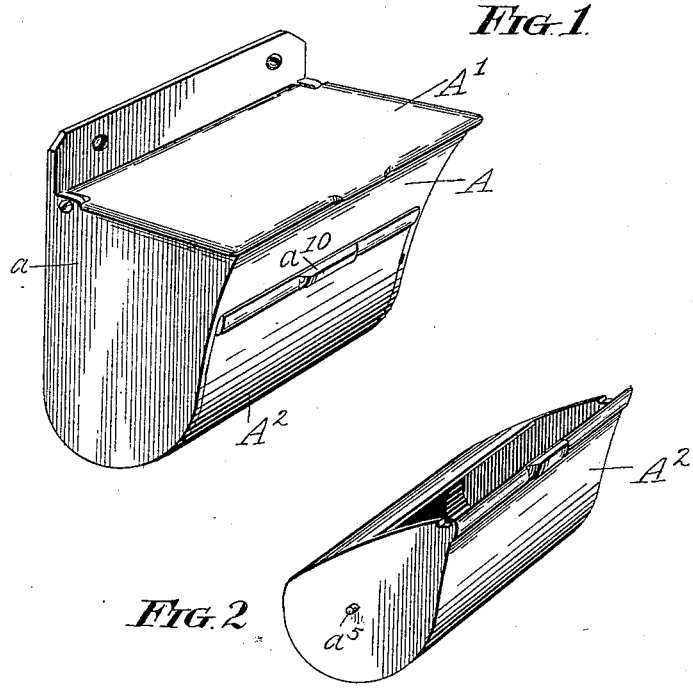
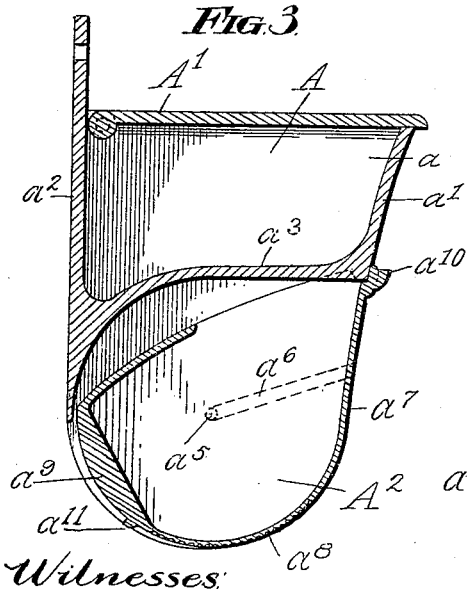
Witnesses:
J. Halpenny
William F. Conklin
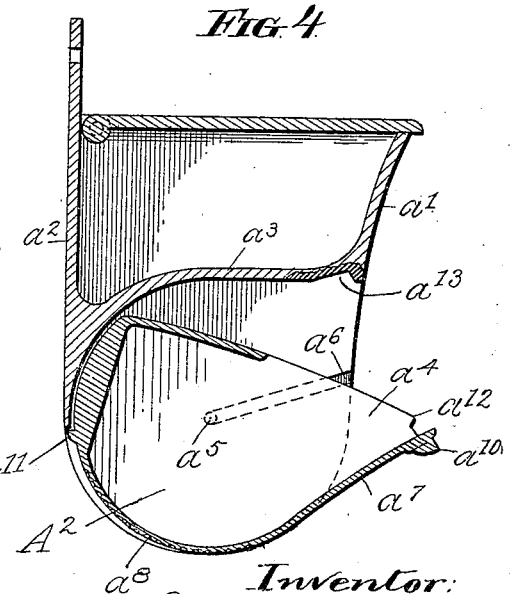
Inventor:
Prescott G. Hale
by Carter & Graves
Attys

UNITED STATES PATENT OFFICE.

PRESCOTT G. HALE, OF CHICAGO, ILLINOIS.

MATCH-SAFE.

SPECIFICATION forming part of Letters Patent No. 640,763, dated January 9, 1900.

Application filed September 28, 1898. Serial No. 692,055. (No model.)

*To all whom it may concern:*

Be it known that I, PRESCOTT G. HALE, of Chicago, in the county of Cook and State of Illinois, have invented certain new and useful Improvements in Match-Safes, of which the following is a specification.

This invention relates to improvements in match-safes, and particularly in that class of such devices which combine a receptacle for unused matches and a receptacle for burned matches.

The invention consists in the matters herein set forth, and particularly pointed out in the appended claims, and will be fully understood from the following detailed description when considered in connection with the accompanying drawings, in which—

Figure 1 is a perspective view of a match-safe embodying my invention. Fig. 2 is a similar view of the burned-match receptacle thereof. Fig. 3 is a transverse sectional elevation of the match-safe. Fig. 4 is a similar view showing the open position of the burned-match receptacle.

Referring to said drawings, the match-safe comprises an upper receptacle A, comprising side walls $a$, front and rear walls $a'$ and $a^2$, respectively, and a bottom wall $a^3$, all preferably cast integral with each other. This receptacle is designed to contain fresh or unused matches and is desirably provided with a hinged cover A', as shown. The side walls $a$ of the safe depend below the bottom $a^3$ of the upper receptacle and serve to support between them a lower burned-match receptacle A². This latter is made with side walls $a^4$, spaced just wide enough apart to enter between the depending side walls $a$ of the upper receptacle and provided with projecting pintles $a^5$, by which the lower receptacle is pivotally supported in grooves $a^6$, that are formed in the inner faces of the depending side walls $a$ and that extend downwardly and rearwardly from the front edges thereof. The side walls $a^4$ of the lower receptacle are connected by a front wall $a^7$, a bottom wall $a^8$, and a rear wall $a^9$, all desirably cast integral with each other and with side walls $a^4$ and all herein shown as merging into each other by easy curves and without any particular lines of separation, although they may be otherwise constructed in this latter respect.

The rear portion of the lower receptacle back of its pintles $a^5$ is made heavier than its front portion by an amount sufficient to normally tip the front of the receptacle upward until it is closed by coming in contact with the bottom wall $a^3$ of the compartment above, such preponderance of weight being in this instance provided by increasing the thickness of the rear wall $a^9$ to the necessary extent. To place burned matches within the lower receptacle, it is tipped forward, as shown in Fig. 4, by means of a projecting ledge $a^{10}$ at its upper front edge, and to prevent its being tipped so far as to spill its contents it is provided with projecting stops $a^{11}$, which come in contact with the lower edge of the rear wall $a^2$ of the safe, and thus limit the extent to which the receptacle can open. The bottom wall $a^8$ is, furthermore, shown as roughened or serrated, so that matches can be ignited by scratching them upon this roughened surface, and to prevent the upward pressure applied to the box when matches are thus ignited thereon from moving the receptacle bodily upward and forward along the inclined grooves $a^6$, and perhaps out of the casing altogether, the receptacle is provided along the upper edges of its side walls with projecting points $a^{12}$, which when it is closed enter recesses $a^{13}$ in the superjacent wall $a^3$ of the casing and form a positive stop against any bodily movement of the receptacle due to such pressure, but do not in any way interfere with the swinging of the receptacle on its pintles.

The construction thus described is such that in its normal closed position the burned-match receptacle will be to a considerable degree air-tight, so that any spark or flame remaining on a burned match after it is placed in the receptacle will tend to be promptly smothered, and thereby prevented from igniting the other burned matches or the unused matches in the compartment above. To empty out the burned matches, it is only necessary to tip the receptacle slightly until its points $a^{12}$ clear the recesses $a^{13}$ and to then draw it bodily forward until its pintles leave the grooves $a^6$. It will then be clear of the casing and may be inverted to spill out its contents, after which it may be readily replaced as before.

While thus described as a match-safe, however, the device may obviously be employed to hold any other material or commodity, if desired. It will also be understood that the self-closing receptacle described may be advantageously employed in situations or for purposes in which the upper compartment would be unnecessary and could be dispensed with and that the device may be made in whole or in part of sheet metal or other material instead of cast metal, if so desired.

I claim as my invention—

1. The combination with the casing having side walls provided in their inner faces with the grooves $a^6$ extending downwardly and rearwardly from the front edges of said walls, of the self-closing receptacle having pintles $a^5$ removably seated in the lower rear ends of said grooves and pivotally supporting said receptacle, the latter being made heavier in its rear portion and provided with the exposed roughened bottom $a^8$ and with rigidly-attached upwardly-projecting points $a^{12}$ engaging recesses $a^{13}$ in the casing to prevent the receptacle from being lifted bodily to unseat its pintles when struck upon its roughened bottom, said points and recesses at the same time not interfering with the pivotal movement of the receptacle, substantially as described.

2. The combination with the casing having an upper compartment formed by side walls $a$, front and rear walls $a'$ and $a^2$ and a bottom wall $a^3$, said side walls depending below the bottom wall, and being provided in their inner faces of the depending portions with grooves $a^6$ extending downwardly and rearwardly from the edges of said walls, of the self-closing receptacle $A^2$ having pintles $a^5$ removably seated in the ends of said groove and pivotally supporting said receptacle, the latter being made heavier in its rear portion and provided with the exposed roughened bottom $a$ with upwardly-projecting points $a^{12}$ engaging recesses $a^{13}$ in the casing, and having stops $a^{11}$ adapted to strike the casing to limit the opening of the receptacle, substantially as described.

In testimony that I claim the foregoing as my invention I affix my signature hereto, in the presence of two subscribing witnesses, this 24th day of September, 1898.

PRESCOTT G. HALE.

Witnesses:
HENRY W. CARTER,
WILLIAM F. CONKLIN.